March 28, 1933.    R. W. BROWN    1,903,165
INSTRUMENT FOR CONTROLLING TEMPERATURES
Original Filed July 17, 1924    7 Sheets-Sheet 4
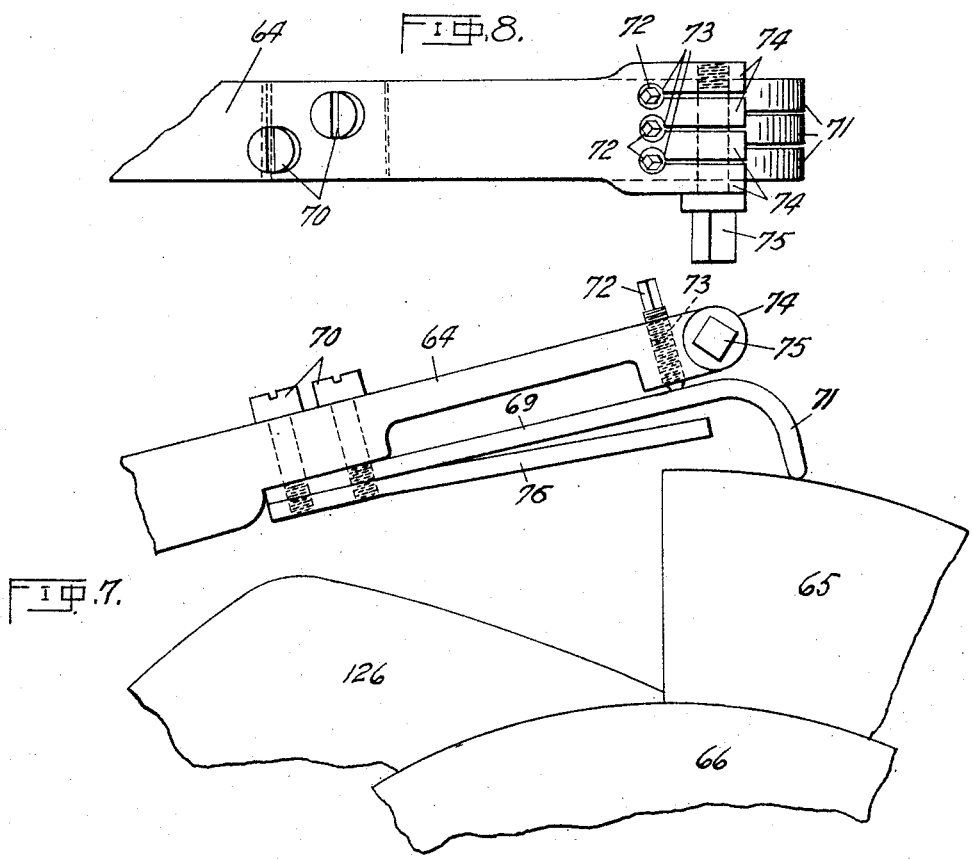
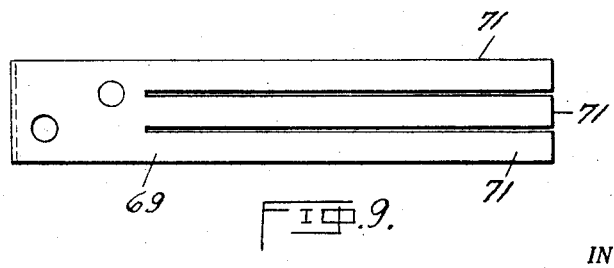
INVENTOR.
Roy W. Brown.
BY Ely & Barrow
ATTORNEYS.

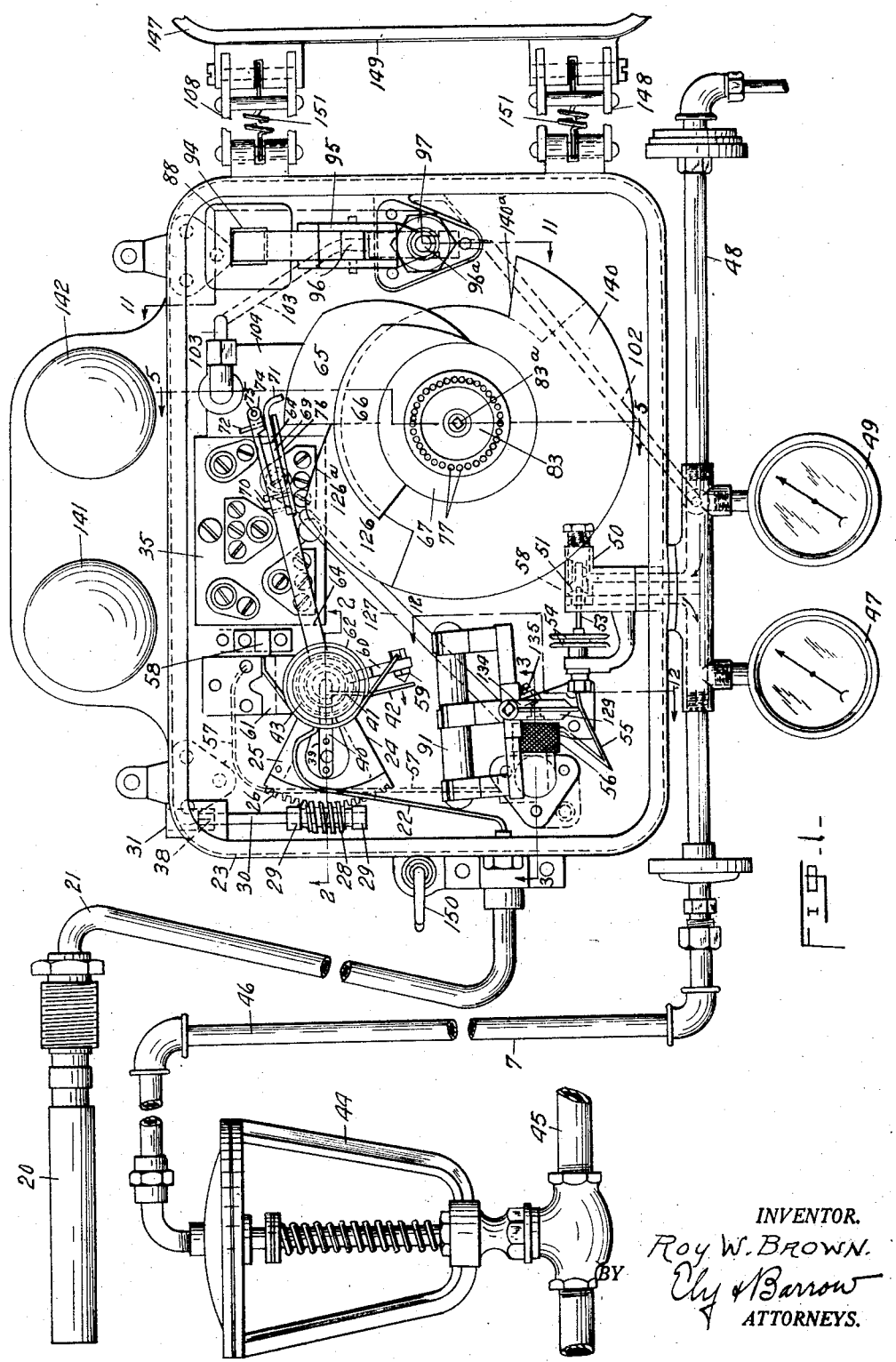

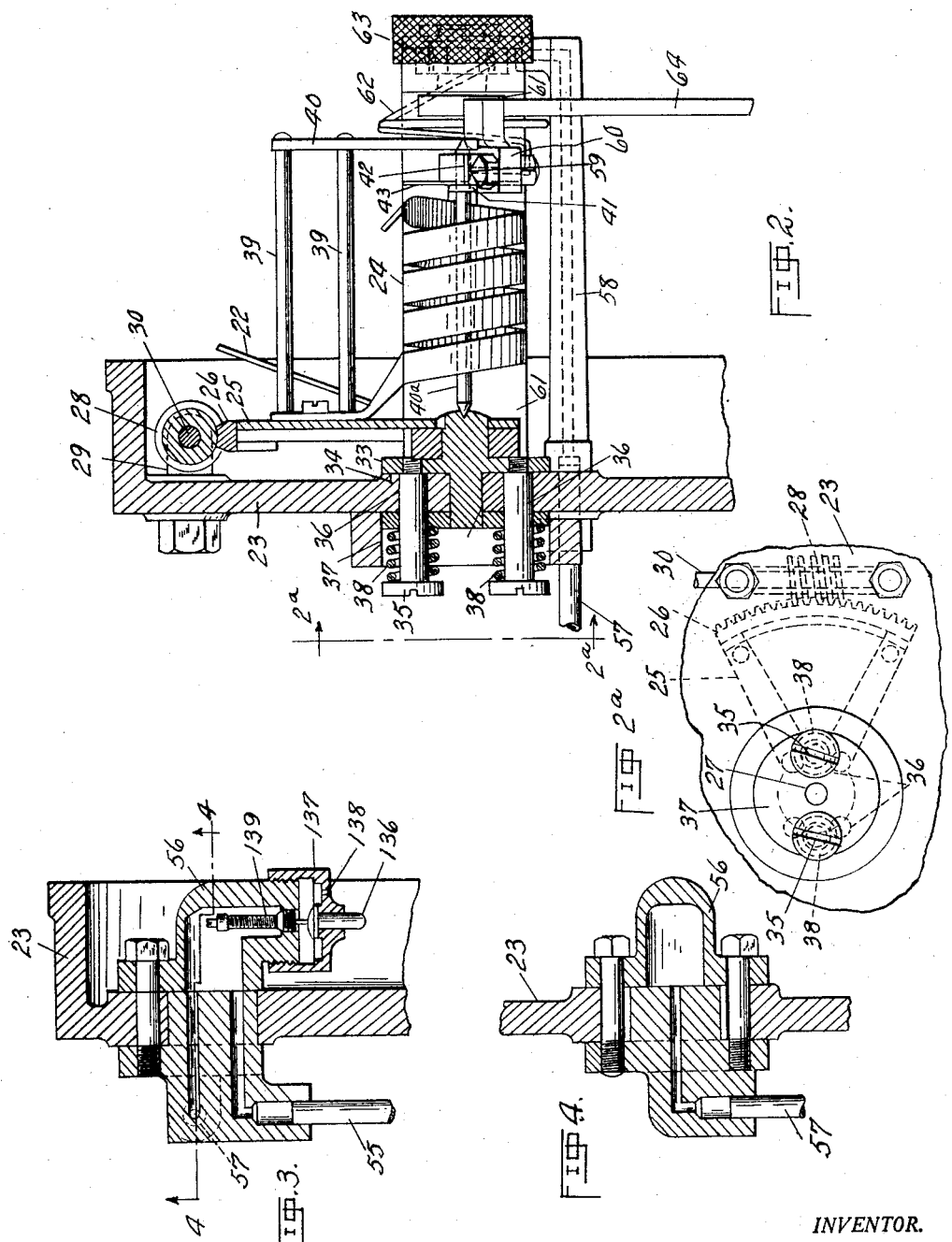

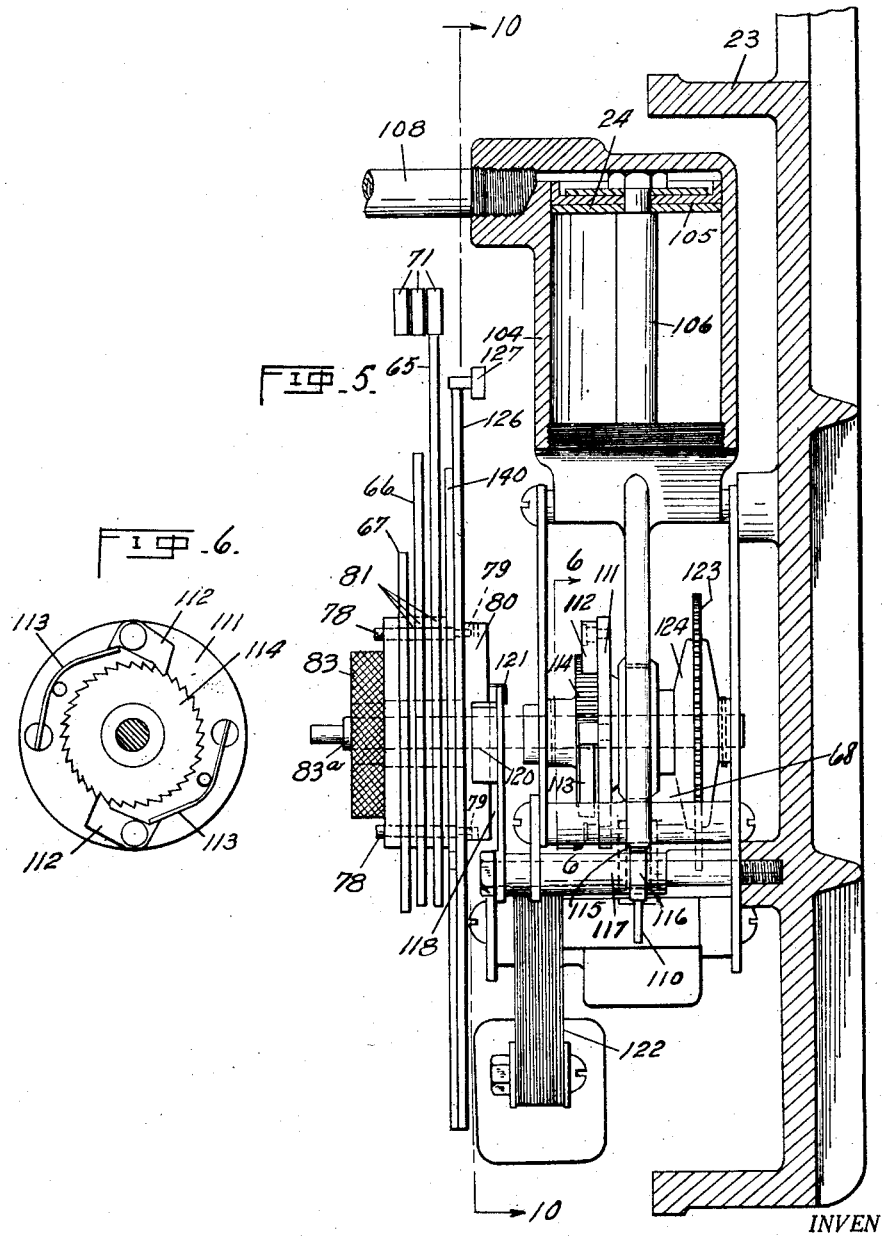

March 28, 1933.  R. W. BROWN  1,903,165
INSTRUMENT FOR CONTROLLING TEMPERATURES
Original Filed July 17, 1924  7 Sheets-Sheet 5
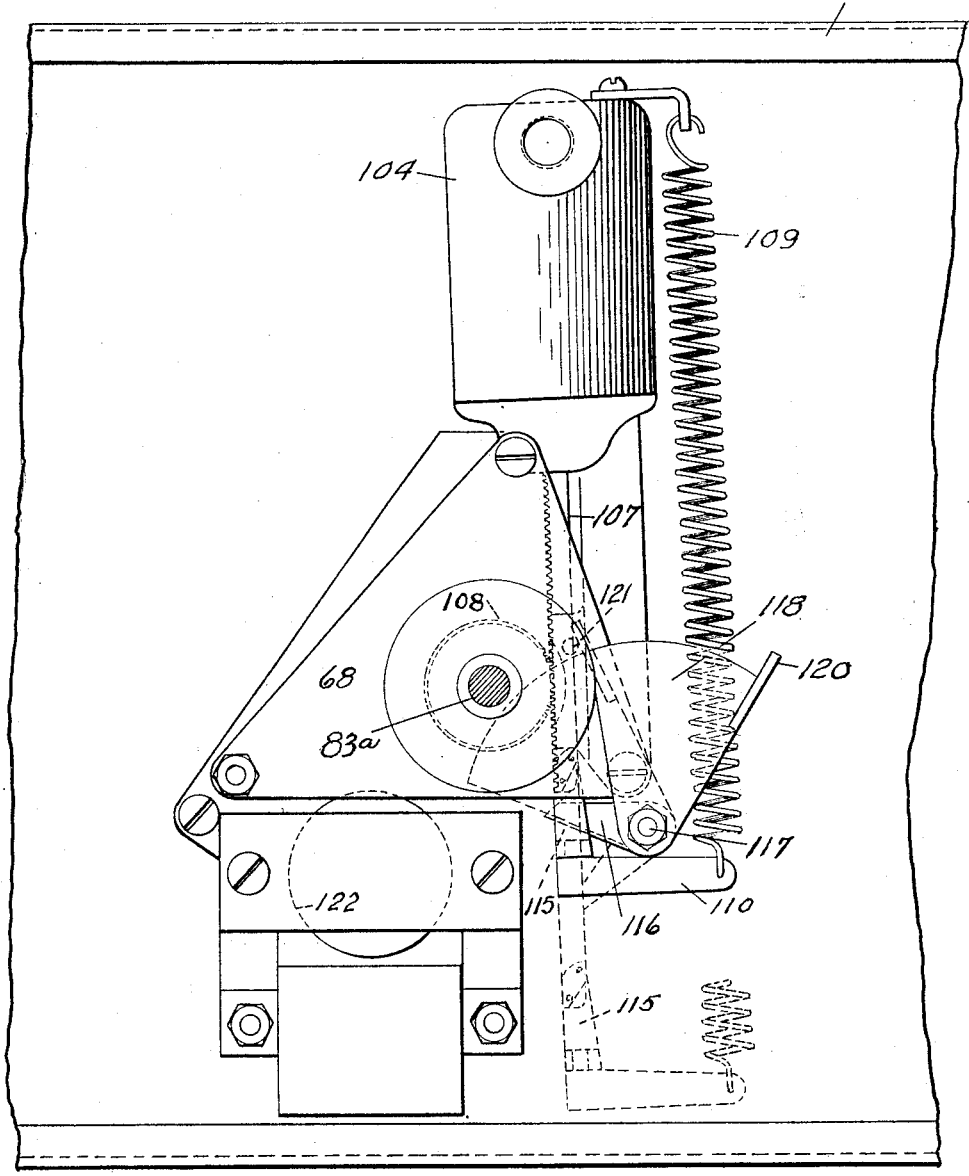
INVENTOR.
Roy W. Brown.
BY Ely & Barrow
ATTORNEYS.

March 28, 1933. R. W. BROWN 1,903,165
INSTRUMENT FOR CONTROLLING TEMPERATURES
Original Filed July 17, 1924 7 Sheets-Sheet 6
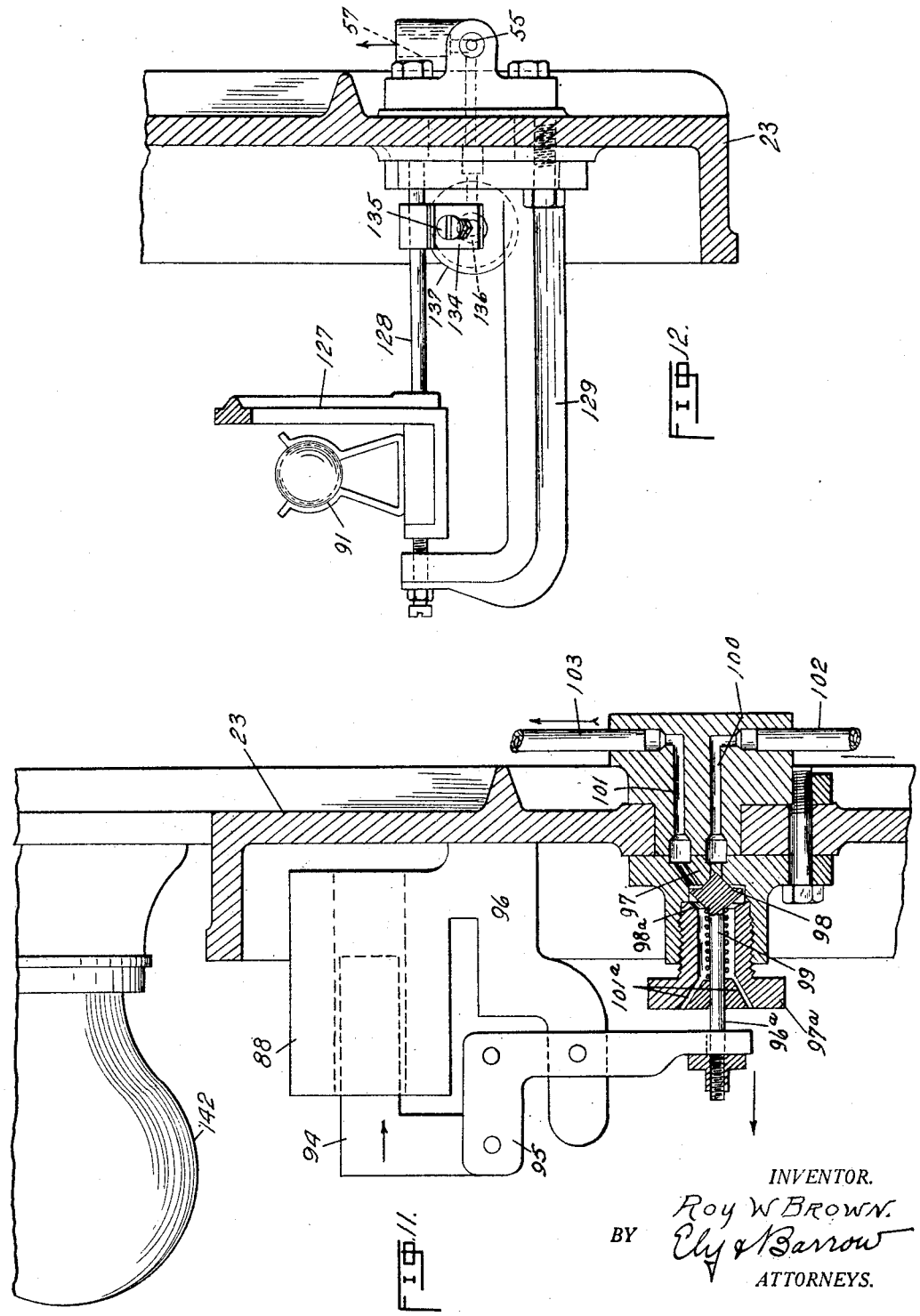
INVENTOR.
Roy W Brown.
BY Ely & Barrow
ATTORNEYS.

March 28, 1933. R. W. BROWN 1,903,165
INSTRUMENT FOR CONTROLLING TEMPERATURES
Original Filed July 17, 1924 7 Sheets-Sheet 7
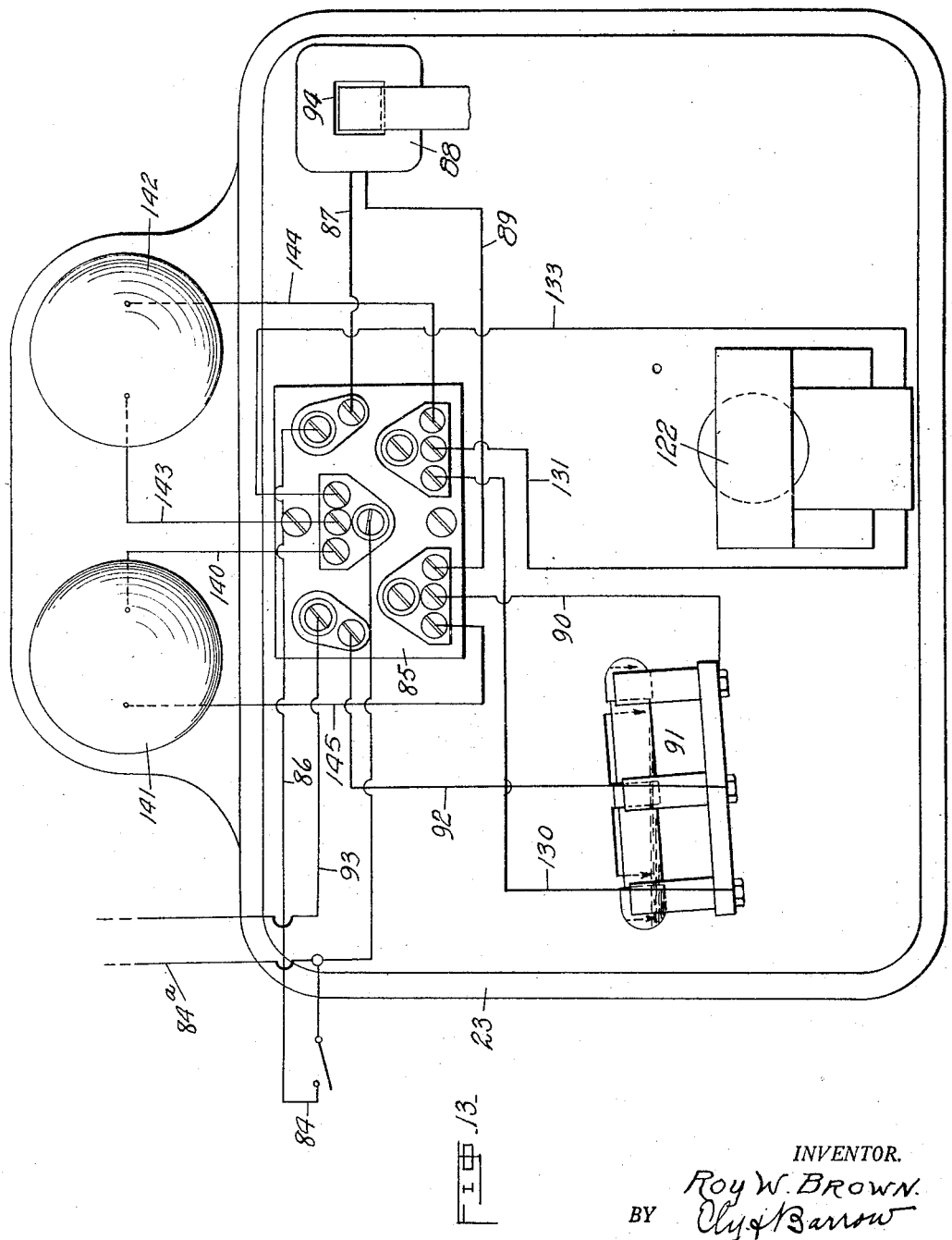
INVENTOR.
Roy W. Brown.
BY
ATTORNEYS.

Patented Mar. 28, 1933

1,903,165

UNITED STATES PATENT OFFICE

ROY W. BROWN, OF AKRON, OHIO, ASSIGNOR TO THE FIRESTONE TIRE & RUBBER COMPANY, OF AKRON, OHIO, A CORPORATION OF OHIO

INSTRUMENT FOR CONTROLLING TEMPERATURES

Original application filed July 17, 1924, Serial No. 726,611, Patent No. 1,768,349, dated June 24, 1930. Divided and this application filed April 9, 1930. Serial No. 442,802.

This invention relates to an instrument for controlling the temperature of heaters or the like, such, for example, as are employed in the vulcanization of tires, and relates to a device which will also vary the temperature automatically at predetermined times.

The chief objects of the invention are to provide a device which, after it is started, will automatically control the temperature in a heater, which will vary that temperature at predetermined time intervals, which is adapted automatically to stop at the completion of the heating operation, which will signal the heater operator during the cure and at the completion of the cure, and which is adapted to be automatically reset from a remote station and again started for the next heating operation.

The above and other lesser objects will become more apparent as the device is described in connection with the accompanying drawings, it being understood that the invention is not limited to the specific form thereof shown and described.

Of the accompanying drawings:

Figure 1 is a front elevation of the device housed in a casing, the door of which is open and illustrating the manner of its connection to a thermostat which is disposed in the heater and to a diaphragm valve for controlling the admission of steam to the heater;

Figure 2 is an enlarged section on line 2—2 of Figure 1;

Figure 2A is a rear plan of the Bourdon coil adjusting device;

Figure 3 is an enlarged section on line 3—3 of Figure 1;

Figure 4 is a section on line 4—4 of Figure 3;

Figure 5 is an enlarged section on line 5—5 of Figure 1;

Figure 6 is a section on line 6—6 of Figure 5;

Figure 7 is an enlarged detail in side elevation of the rider on the vent operating arm;

Figure 8 is a plan thereof;

Figure 9 is a detail plan of the rider;

Figure 10 is a section on line 10—10 of Figure 5;

Figure 11 is an enlarged section on line 11—11 of Figure 1;

Figure 12 is an enlarged section on line 12—12 of Figure 1; and

Figure 13 is a diagrammatic view illustrating the wiring by which the device may be remotely controlled.

This application is a division of my copending application Serial No. 726,611, filed July 17, 1924 now Patent 1,768,349, June 24, 1930.

The device, in general, includes a system affected by temperature, a system affected by time, a starting and stopping system with a remote control and a signalling system.

*The temperature controlled system*

Referring to the drawings, 20 (Figure 1) is a thermostat bulb containing a substance adapted to develop pressure with variations in temperature, the bulb being adapted to be mounted in a heater and being connected by a flexible pipe 21 to a second flexible coupling 22 mounted in a casing 23 in which are housed the various parts of the control device. The coupling 22 places the pressure developing fluid in the thermostat 20 in communication with a Bourdon coil 24, (Figure 2), which is mounted on a plate 25 secured on a sector worm gear 26 journaled in the casing 23 at 27. The worm gear 26 meshes with a worm 28 (Figures 1 and 2) journaled in bearings 29, 29 on the casing 23 and adapted to be rotated by a shaft 30 extending out of the casing into a socket 31 and having a squared end 32 adapted to receive a key by which the worm may be rotated to adjust the position of the Bourdon coil for a purpose later to be described. The sector gear 26 has secured thereon a plate 33 bearing against a surface 34 on the casing, the plate 33 having secured thereon studs 35, 35 which project through arcuate slots 36, 36 (Figure 2A) through the wall of casing 23, the studs being inserted through apertures in a friction plate 37 held against the rear surface of the casing 23 by springs 38, 38 whereby adjustment of the Bourdon coil can be accurately made and cannot be accidently disturbed.

A pair of bracket rods 39, 39 are secured on the plate 25 and extend outwardly therefrom to support a bracket plate 40 in which is pivoted a shaft 40ª, having secured thereto an arm 41 which is secured at its other end to the Bourdon coil 24. Rotatably mounted on shaft 40ª is a flap 42 yieldably connected to arm 41 by a hairspring 43 and so arranged to engage arm 41 when the direction of motion is such as to bring these two parts together. The position of the flap 42, in space therefor, is a function of the temperature in the heater, the flap being capable of adjustment to a normal or zero position by the worm gear sector 26 and worm 28.

The flap 42 is adapted to control the temperature in the heater by the following devices. A pressure operated diaphragm valve 44 is mounted in a steam line 45 leading from a source of supply (not shown) to the heater, the valve being adapted to be closed by pressure of air and to open as the pressure is reduced. The valve 44 is, therefore, connected to an air line 46 in which there is a gage 47 for indicating the pressure and consequently the condition of the diaphragm valve. Pressure is supplied to the line 46 by a supply line 48, which has a gage 49 therein, through a diaphragm valve 50, the operation of which latter valve is controlled by the flap 42. The valve 50 includes a seat 51 and a head 52 arranged to cooperate with the seat, the head being formed on a hollow stem 53 arranged to deliver air from the supply line 48 to expansible diaphragms 54, 54 through which the air passes. A flexible pipe 55 leads from the diaphragm 54 to a vent valve 56 (Figures 3 and 4) which is normally closed, but constructed to be automatically opened as will later be described. From valve 56, there leads a flexible pipe 57 which is arranged to conduct the air to a hollow bracket 58 (Figure 2) mounted on casing 23, the bracket 58 being adapted to conduct the air outwardly from the casing to a vent 59 mounted on an arm 60 pivoted at a point on the axis of the Bourdon coil 24, on a bracket 61, communication of the vent 59 with the air led up through bracket 58 being established by a flexible coiled pipe 62. The position of vent 59 in space is adapted to be time controlled by apparatus described below.

*The time controlled system*

The arm 60, as above stated, is pivoted on bracket 61. The manner of pivoting the arm may be as shown in Figure 2 and includes a ball bearing 63 whereby the arm may easily swing on its pivot. The position of arm 60 is adapted to be controlled by a comparatively long arm 64 formed thereon and arranged to ride on a series of cams 65, 66, 67 mounted so as to be rotated by suitable clockwork which may be an electric clock 68 (Figures 5 and 10) of suitable construction, modified, as will be described, to perform special functions desired in this apparatus. The arm 64 has a rider 69 adjustably mounted on the under side thereof, the rider being formed of spring metal secured at one end to the arm by screws 70, 70 and formed in this instance with three independently adjustable prongs 71, 71 (Figures 7, 8 and 9). For adjusting each prong 71 is a set screw 72 extending through an aperture 73 in the outer end of arm 64. The arm 64 is slit inwardly from the outer end to each aperture 73 to provide four yielding prongs 74, 74 adapted to be clamped together by a bolt 75 to bind the screws 72 in their adjusted position. Adjustment of the rider prongs 71 away from arm 64 is limited by a plate 76 secured by the screws 70 onto the under side of arm 64. One prong 71 rides on cam 65, another on 66 and the third on 67 and each is, therefore, independently adjustable on each cam. The position of vent 59 will determine the operative position of flap 42, the closing and opening of which will determine the position of the diaphragm valve 44 as will later be explained and hence will determine the temperature in the heater. The cams 65, 66 and 67, therefore, are such as to define the time at which the temperature control will be effective.

In the curing of tires in a heater the process goes through several stages. Thus in the particular apparatus here shown, cam 65 is utilized to set the vent 59 for control at a temperature, for example, of 240°; cam 66 is utilized to set the vent 59 for control at, for example, 270°; and cam 67 to set the vent 59 for control at 290°. These temperatures are determined by the heights of the respective cams, by the positions of the respective rider prongs 71 and by the position of the Bourdon coil and flap 42. The instrument may, therefore, be adjusted to control at precisely the desired temperature.

In order that the time for which each stage of the process is to be conducted may be accurately predetermined, the cams 65, 66 and 67 are arranged so that the arm 64 rides on the highest cam 65 for the lowest temperature and drops onto the lower cams 66 or 67 for each respective increase in temperature. In order that the period of time each stage of the process is conducted may be varied, each cam 65, 66 or 67 is provided with a series of apertures 77, 77 spaced 10° (5 minutes) apart on the cams, pins 78, 78 being inserted through the apertures in the cams and extending into depressions 79, 79 in a hub 80 on which the cams are mounted to hold the cams in place, suitable spacers 81, 81 being interposed between the cams, and the cams and spacers being secured on the hub by a nut 83, the hub being secured on the driven shaft 83ª of the clock 68. The clock is adapted to be started from a remote control, driven through a definite cycle and then automatically stopped, the apparatus for actuating this part of the mechanism being described below.

The starting and stopping system

Referring to Figure 13, 84 is a remote control switch at a central station at which a series of heater control devices constructed according to the invention may be controlled by a single attendant, the switch being in an electric circuit from suitable power supply leads 84$^a$ and 93 furnished to a panel 85. The switch 84 may be an ordinary button switch normally open but adapted to complete a circuit from power lead 84$^a$ through leads 86 and 87, through a solenoid 88, through leads 89 and 90, through the right contacts (as shown in Figures 1 and 13) of a mercoid contactor 91, and through lead 92 to power lead 93, thus to energize the solenoid 88 (Figure 11). Arranged to be actuated by the solenoid 88 is a core 94 secured on a lever 95 pivoted on a bracket 96 which is secured on the casing 23, the lever 95 being arranged to operate the stem 96$^a$ of a valve 97 (Figures 1 and 11), the stem having a head 98 thereon normally seated by a spring 99 but adapted to be withdrawn from its seat when solenoid 88 is energized to place passages 100 and 101 in communication. When valve 97 is closed, passage 101 is vented to the atmosphere past valve stem head 98 and through vents 101$^a$ formed in plug 97$^a$, these vents being closed when stem 96$^a$ is withdrawn by the solenoid to seat head 98 against valve seat 98$^a$ formed on the inner end of plug 97$^a$. Air is supplied to passage 100 from supply line 48 by a flexible pipe 102 and air is conducted from the valve passage 101 by a flexible pipe 103 to the upper part of a clock setting cylinder 104 (Figures 1, 5 and 10).

A piston 105 (Figure 5) is mounted in the cylinder 104 and has connected thereto a piston rod 106 having formed thereon a rack 107 (Figure 10). The rack 107 is in mesh with a gear 108 journaled on the driven shaft 83$^a$ of the clock 68, the rack being normally urged upwardly by a spring 109 secured at one end to the cylinder 104 and at the other to an arm 110 on the rack bar 107. The rack 107 is adapted to rotate the clock-shaft 83$^a$ to starting position when solenoid 88 is energized, hence, in its downward movement it must be clutched to the shaft 83$^a$ and when drawn backwardly therefrom by spring 109, must be released therefrom. To this end the gear 108 has rotatively secured thereto, a pawl clutch disk 111 (Figures 5 and 6) carrying pawls 112, 112, pressed by springs 113, 113 into engagement with a ratchet 114 pinned or otherwise secured on the shaft 83$^a$. To limit the rotation of shaft 83$^a$ so as to properly position the cams in starting position, the rack 107 is formed with a slot or aperture 115 (Figures 5 and 10) in its lower end, in which is engaged the free end of a lever 116 which is secured to a rock shaft 117 on which is secured a sector disk 118, the latter being normally held in the position shown in full lines in Figure 10 by spring 109 acting through rack 107, but being adapted to be swung into the position shown in dotted lines by the rack bar. The sector 118 has a stop plate 120 thereon adapted to engage the cam-supporting hub 80 at the limit of swing of the sector and the arcuate edge of the sector is adapted to be engaged by a stop pin 121 on the hub 80.

The clock 68 comprises a motor 122 and standard clock mechanism (not shown), which drives the clock-shaft driving gear 123 (Figure 5). Gear 123 is not affected by resetting of the clock, due to the slippage of the usual friction clutch 124 thereon.

To the end that resetting of the clock will immediately start the automatic operation of the device, a start cam 126 is secured on the hub 80 and has riding thereon an arm 127. As the clock is reset by the operation of the solenoid 88 to rotate the cams 65, 66 and 67 to starting position (as shown in Figure 1), the arm 127 is adapted to ride upon the surface 126$^a$ of cam 126. The arm 127 is connected to the mercoid contactor at its pivot point, the contactor being mounted (Figure 12) on a rock shaft 128, mounted in a bracket 129, secured on the casing 23, whereby start cam 126 is adapted to rock the contactor from its position before resetting to the position shown in Figures 1 and 13. The contactor 91 is thus adapted automatically to break the circuit to solenoid 88 and to establish a circuit (Figure 13) including lead 92, contactor 91, leads 130 and 131, clock motor 122, lead 133; leads 92 and 133 being connected to the power leads 93 and 84$^a$, respectively, so as to operate the clock for driving the cams.

The arm 127 is also adapted through cooperation with start cam 126 to start the operation of the temperature control. A comparatively short arm 134 on shaft 128 has mounted thereon a set screw 135 adapted to engage a valve operating plunger 136 (Figure 3), mounted in a valve cap 137, having a vent opening 138 therein. The plunger 136 is arranged to engage the stem of an ordinary tire valve 139. Before the apparatus is started the valve 139 is held open by arm 134, but the latter is so arranged on shaft 128 as to be adapted to be swung away from valve operating plunger 136 by cam surface 126$^a$ to close the valve, thus to permit air to flow to vent 59 to effect temperature control.

The apparatus is adapted to be stopped by a stop cam 140 secured on hub 80, arm 127 being adapted to ride on the surface of this cam which is concentric with cam 126 over a considerable arc thereof. The cam 140 has a drop 140$^a$ therein which can be positioned relatively to the starting surface 126$^a$ of cam 126 to secure any desired length of cure, cam 140 having spaced apertures therein similar to apertures 77. Arm 127 is adapted to drop at 140$^a$ on the cam 140 simultaneously to vent valve 56 to stop the heater control and to swing mercoid contactor 91 to the right to break the circuit to the clock and to establish the solenoid circuit 88 which remains open, however, until manually closed by operating button switch 84, which latter, as will be apparent, is not in the clock circuit.

The signalling system

The signalling system includes an arrangement of various colored lights or other suitable devices, in this instance, a blue light 141 and a red light 142 being used, duplicate lights (not shown) being provided for each of a series of heaters at the central station.

As shown in Figure 13, the red light 142 is lighted when the apparatus is in operation, the light 142 being connected in parallel with the motor 122 by leads 143 and 144, a second red light at the central station (not shown) also being arranged in parallel with the clock motor.

The blue light 141 is arranged to be lighted when the stop cam 140 (Figure 5) permits the arm 127 to drop along the cam face 140$^a$ as it does when the cure is being stopped. When the cure is being made and the controller in operation, the red light 142 is burning. Thus at each position of the arm 127 contact is broken at one end of the mercoid contactor tube 91 and made at the opposite end, which serves in the case of stopping the controller to break the circuit to the clock motor 122, thus stopping the clock, and to break the circuit to the light 142, thus extinguishing the red light as well as connecting the circuit to light 141, thus lighting the blue light, and to complete the solenoid circuit to the switch, thus connecting the circuits so that the instrument can be reset to the starting position and started by operating the switch 84. After starting, an exact reversal of the above described operation occurs.

It is possible to turn off the blue light when the controller is in the stopped position by interrupting the current supply which gives a third signal condition of the lights.

In order that the parts of the device may not be affected by dirt, moisture and the like, which are ever present in the curing department of tire factories, the casing 23 is provided with a cover 147 (Figure 1) pivoted thereon by double hinges 148, 148, the cover 147 being gasketed at 149, and a clamp 150 being adapted to secure it against the casing 23 at one end, springs 151, 151 being adapted to hold the cover tightly against the casing.

The operation of the device which will be apparent from the foregoing description may be briefly described as follows:

Assuming the parts to be arranged as they will be after a preceding heating operation, arm 127 will be lying on the surface of cam 126 just as it has fallen at 140$^a$ from cam 140. Contactor 91 will be swung clockwise from the position shown in Figure 1. Air will be vented at valve 56, consequently diaphragms 54 will be collapsed since there will be no air pressure in the system including valve stem 53, diaphragms 54, pipe 55, valve 56, pipe 57, hollow bracket 58, pipe 62 and vent 59. Valve 50 will, therefore, be wide open and pressure of air in line 48 will be transmitted directly to valve 44 keeping it closed.

When molds containing tires to be treated, for example, are mounted in the heater, the operator first signals by lighting the blue light 141. He then presses button switch 84 which energizes solenoid 88, which latter opens valve 97 permitting air pressure to become effective on piston 105 in cylinder 104. This operates rack 107 which, by means of gear 108 and ratchet disk 111, rotates clock shaft 83$^a$ by the ratchet 114, thus rotating cams 65, 66, 67, 126 and 140 to the positions shown in Figure 1, these positions being accurately controlled by engagement of stop pin 121 with sector 118 which has been rotated into the path of the pin by rack bar 107 engaged with trip lever 116.

Due to rotation of the cams, arm 127 is carried upwardly on surface 126$^a$ of cam 126 and rocks contactor 91 to the position shown in Figure 1. This breaks the circuit through the solenoid 88 to close valve 97 which permits air to exhaust from cylinder 104 through pipe 103 and vents 101$^a$ and spring 109 pulls rack bar 107 upwardly, clutch disk 112 idling with respect to ratchet 114 during this action and shaft 83$^a$ being held against accidental rotation by clutch 124. Rocking of the contactor 91, as described above, also simultaneously establishes the clock circuit to rotate the cams and lights the red light 142.

Due to the rotation of the cams, the arm 64 is carried up on cam 65 to position vent 59 for control at the desired starting temperature and arm 134 is swung away from vent valve 56, thus permitting air pressure to build up in the system including the hollow stem 53, diaphragms 54, pipe 55, valve 56, pipe 57, etc., to vent 59 which is closed by flap 42 because the Bourdon coil is, as yet, unaffected by the fluid in thermostat 20. The building up of pressure in the above system forces valve 50 shut causing diaphragms 54 to expand moving valve head 52 against its seat 51 and consequently cuts off the supply of air to diaphragm valve 44, thus admitting steam to the heater.

As the temperature in the heater rises, the

Bourdon coil tends to unwind, as will be understood, and presently it carries flap 42 away from vent 59, the position of which is so fixed by cam 65 as to cause this action to take place, in this instance, at 240°. As flap 42 moves away from vent 59, pressure of the air in the vent system diminishes, thereby causing valve 50 to open to thus admit air to the diaphragm valve 44 which tends to close the same. In this manner flap 42 will imperceptibly vibrate over vent 59 at such a distance therefrom as to open valve 44 just to the extent required to maintain a temperature of 240°.

At the end of a predetermined time, depending on the relative positions of cams 65 and 66, arm 64 will drop from cam 65 onto cam 66, thus setting vent 59 in a position to control at 270°. This causes the vent 59 to engage the flap which thereby causes the diaphragm valve 44 to open wide, as will be understood, until the desired temperature, for example, 270°, is reached, whereupon the flap will again start controlling the valve 44 to maintain such temperature.

In a similar manner after another predetermined time interval, the arm 64 will drop on cam 67 so that the flap will control the valve 44 to maintain the desired heater temperature, for example of 290°. It is to be noted that by arranging the arm 64 to drop from one cam surface to another to establish higher temperatures, the change from one stage of the process to another is as rapid as the building up of steam pressure entering the heater through a wide open valve will permit, so that practically the change is instantaneous.

Curing at 290° will proceed until the tires are completely vulcanized, whereupon arm 127 will drop on cam 140 at 140ᵃ to swing the arm 134 so as to permit valve 56 to open, whereby valve 50 will also open and diaphragm valve 44 will be closed. Simultaneously, contactor 91 will be swung clockwise, thus to break the clock circuit and the red light circuit and to establish the blue light circuit, the resetting solenoid circuit being also placed in condition to be again closed by switch 84.

The independently adjustable riders 69 on each of cams 65, 66 and 67 enable accurate setting of the vent 59 for the relative temperatures desired in each stage of the process. The adjustment of Bourdon coil 24 by worm shaft 30 permits a setting of the flap 42 relative to the positions of the vent determined by each cam so as absolutely to determine the temperature controlled by the vent at each of its positions.

Modifications of the invention may be resorted to without departing from the spirit or scope thereof as set forth in the appended claims.

What is claimed is:

1. Apparatus of the class described comprising a clock, a cam member driven by said clock, an electrically operated means for resetting said cam member, a contactor, a remote control switch connected in an electrical circuit with said means and said contactor, and means actuated by said clock for operating said contactor, said contactor being adapted to automatically break the circuit to the switch as the cam member is reset.

2. Apparatus of the class described comprising an electric clock, a cam member driven by said clock, electrically operated means for resetting the cam member, said clock and said means being in separate circuits, and a contactor actuated by the cam member resetting means for breaking its circuit and establishing the cam member circuit.

3. Apparatus of the class described comprising an electric clock, a cam member driven by said clock, electrically operated means for resetting the cam member, said clock and said means being in separate circuits, a remote control switch in circuit with said means, and a contactor actuated by the cam member resetting means for breaking its circuit and establishing the clock circuit.

ROY W. BROWN.